US012568345B2

(12) United States Patent
Kawasaki et al.

(10) Patent No.: US 12,568,345 B2
(45) Date of Patent: Mar. 3, 2026

(54) POPULATION ESTIMATION DEVICE

(71) Applicant: NTT DOCOMO, INC., Chiyoda-ku (JP)

(72) Inventors: Satoshi Kawasaki, Chiyoda-ku (JP); Shin Ishiguro, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 381 days.

(21) Appl. No.: 18/248,727

(22) PCT Filed: Oct. 11, 2021

(86) PCT No.: PCT/JP2021/037601
§ 371 (c)(1),
(2) Date: Apr. 12, 2023

(87) PCT Pub. No.: WO2022/107497
PCT Pub. Date: May 27, 2022

(65) Prior Publication Data
US 2023/0379663 A1     Nov. 23, 2023

(30) Foreign Application Priority Data

Nov. 19, 2020     (JP) ................................ 2020-192387

(51) Int. Cl.
*H04W 4/029*          (2018.01)
(52) U.S. Cl.
CPC ................................. *H04W 4/029* (2018.02)
(58) Field of Classification Search
CPC ....... H04W 4/029; H04W 4/02; H04M 11/00; G06Q 50/10
See application file for complete search history.

(56) References Cited

U.S. PATENT DOCUMENTS

2017/0228748 A1 *   8/2017   Shibayama ............. H04W 8/08

FOREIGN PATENT DOCUMENTS

JP        2013-121077 A      6/2013
JP            5797120 B2    10/2015

OTHER PUBLICATIONS

International Search Report issued Jan. 11, 2022 in PCT/JP2021/037601 filed on Oct. 11, 2021, 2 pages.

(Continued)

*Primary Examiner* — Catherine T. Rastovski
(74) *Attorney, Agent, or Firm* — Oblon, McClelland, Maier & Neustadt, L.L.P.

(57)          ABSTRACT

A population estimation server 10 according to an embodiment includes a signal acquisition unit 11 that acquires a location registration signal periodically transmitted from a mobile terminal 20 carried by a user, and an estimation unit 12 that aggregates the acquired location registration signals for each area and for each estimation-unit-period and estimates a population for each area and for each estimation-unit-period based on an aggregation result. When an absent period in which the signal from the mobile terminal 20 staying in a target area is not acquired occurs after the location registration signal from the mobile terminal 20 is acquired, the estimation unit 12 interpolates a pseudo signal associated with the mobile terminal 20 in the absent period, and aggregates signals while excluding a location registration signal first transmitted from the mobile terminal after the absent period from an aggregation target.

7 Claims, 12 Drawing Sheets

(56)          References Cited

OTHER PUBLICATIONS

International Preliminary Report on Patentability and Written Opinion issued Jun. 1, 2023, in PCT/JP2021/037601, 5 pages.

* cited by examiner

*Fig.4*

| TIME INFORMATION | USER ID | STAY AREA | |
|---|---|---|---|
| 17:42:03 on October 12, 2019 | A | BASE STATION X, SECTOR L, TRANSMISSION DELAY AMOUNT 100ms | ... |
| 17:38:53 on October 12, 2019 | B | BASE STATION X, SECTOR M, TRANSMISSION DELAY AMOUNT 1000ms | ... |
| 18:03:34 on October 12, 2019 | C | BASE STATION Y, SECTOR N, TRANSMISSION DELAY AMOUNT 50ms | ... |
| ... | ... | ... | ... |

POPULATION ESTIMATION DEVICE

TECHNICAL FIELD

One aspect of the present invention relates to a population estimation device.

BACKGROUND ART

In the related art, a mechanism for estimating a population for each unit area (e.g., 250 m square mesh or 500 m square mesh) based on the number of location registration signals periodically transmitted from a mobile terminal (mobile device) held by a user to a base station and a location of the mobile terminal when the location registration signal is transmitted is known (e.g., see Patent Documents 1 and 2).

CITATION LIST

Patent Document

[Patent Document 1] Japanese Patent No. 5797120
[Patent Document 2] Japanese Unexamined Patent Publication No. 2013-121077

SUMMARY OF INVENTION

Technical Problem

In an event site where many users gather (e.g., a site such as a classical concert) or the like, it is sometimes necessary to turn off the mobile terminal during the event. In this case, the location registration signal may not be transmitted from the mobile terminal whose power is turned off, and the estimated population may be calculated to be smaller than the actual number of users (population). In addition, if many users who gather at the event site perform the operation of turning on the mobile terminal at the same time after the end of the event, there is a possibility that a very large number of location registration signals will be transmitted instantaneously. In this case, in an estimation-unit-period in which many location registration signals are transmitted in a burst manner, there is a possibility that the estimated population is calculated more than the actual number of users. As described above, there is a possibility that the population estimation error increases due to the power-off of the mobile terminal.

An object of an aspect of the present invention is to provide a population estimation device capable of reducing an estimation error due to an influence of power-off of a mobile terminal.

Solution to Problem

A population estimation device according to an aspect of the present invention includes: a signal acquisition unit configured to acquire a signal periodically transmitted from a mobile terminal carried by a user; an estimation unit configured to aggregate the acquired signals for each area and for each estimation-unit-period, and to estimate a population for each of the area and for each of the estimation-unit-period based on an aggregation result. After acquiring the signal from a first mobile terminal that stays in a first area, when an absent period in which the signal from the first mobile terminal is not acquired and which is longer than a transmission interval of the signal in a normal state occurs, the estimation unit interpolates a pseudo signal associated with the first mobile terminal in the absent period, and aggregates signals while excluding the signal first transmitted from the first mobile terminal after the absent period from an aggregation target.

According to the population estimation device according to an aspect of the present invention, when an absent period occurs, such as a period in which the mobile terminal is turned off, for example, a signal that would have been acquired if the mobile terminal were turned on is interpolated as a pseudo signal. As a result, it is possible to reduce the degree to which the estimated population is calculated to be smaller than the actual population (number of staying people) in the absent period. In addition, in a case where the absent period is a period during an event or the like in which the mobile terminal is required to be turned off, there is a possibility that many mobile terminals are turned on simultaneously in an estimation-unit-period after the end of the absent period (i.e., after the end of the event). In this case, the estimated population in the estimation-unit-period is calculated more than the actual population due to the signals transmitted in a burst manner from the plurality of mobile terminals as described above. On the other hand, according to the population estimation device described above, the signal transmitted first after the absent period is excluded from the aggregation target. As a result, it is possible to reduce the degree to which the estimated population in the estimation-unit-period is calculated more than the actual population. Therefore, according to the population estimation device, it is possible to reduce the estimation error due to the influence of the power-off of the mobile terminal.

Advantageous Effects of Invention

According to an aspect of the present invention, it is possible to provide a population estimation device capable of reducing an estimation error due to an influence of power-off of a mobile terminal.

BRIEF DESCRIPTION OF DRAWINGS

FIG. 4 is a diagram illustrating an example of latest information.

DESCRIPTION OF EMBODIMENTS

The following is a detailed description of an embodiment of the present invention with reference to the attached drawings. In the description of the drawings, the same reference signs will be assigned to the same or corresponding elements, and duplicate description thereof will be omitted.

Figure 1:
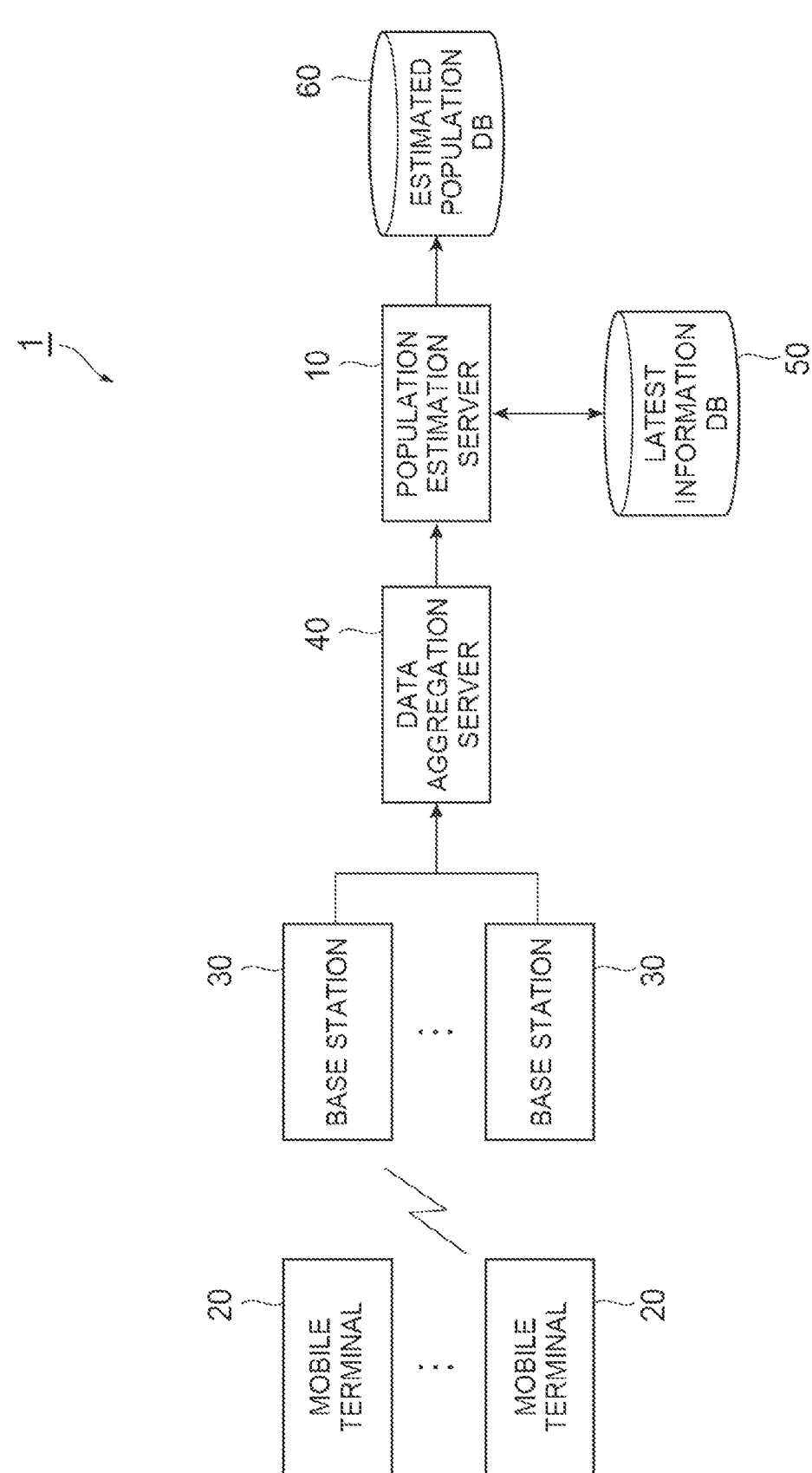
FIG. 1 is a diagram illustrating a configuration of an overall system including a population estimation server according to an embodiment.

FIG. 1 is a diagram illustrating an overall configuration of a population estimation system 1 including a population estimation server 10 (population estimation device) according to an embodiment. As illustrated in FIG. 1, the population estimation system 1 includes the population estimation server 10, a plurality of mobile terminals 20, a plurality of base stations 30, a data aggregation server 40, a latest information DB 50 (database), and an estimated population DB 60. The population estimation server 10 estimates the population for a predetermined estimation-unit-period (e.g., 10 minutes or the like) and for each area based on the location registration signal (signal) transmitted from the mobile terminal 20. The area serving as a unit for population estimation is a predetermined estimation unit area, and is, for example, a half area mesh (area of four sides of 500 m), a quarter area mesh (area of four sides of 250 m), or the like.

The mobile terminal 20 is a terminal carried by a user. The mobile terminal 20 has a mobile communication function. The mobile terminal 20 is, for example, a mobile phone, a smartphone, a tablet terminal, a wearable terminal, or the like. The mobile terminal 20 is configured to transmit a location registration signal to the base station 30 at a predetermined timing. Specifically, the mobile terminal 20 transmits the location registration signal at the timing when the mobile terminal 20 is switched from the power-off state to the power-on state. In addition, the mobile terminal 20 periodically transmits the location registration signal at a predetermined time interval (e.g., 60 minutes) in a state where the mobile terminal 20 is in the power-on state. Furthermore, when the mobile terminal 20 moves from one location registration area to another location registration area (i.e., when the mobile terminal 20 moves across a boundary between adjacent location registration areas), the mobile terminal 20 transmits the location registration signal in order to perform location registration again. Here, the location registration area (LA) is an area in which a plurality of sectors covered by each of the plurality of base stations 30 are grouped.

Figure 2:
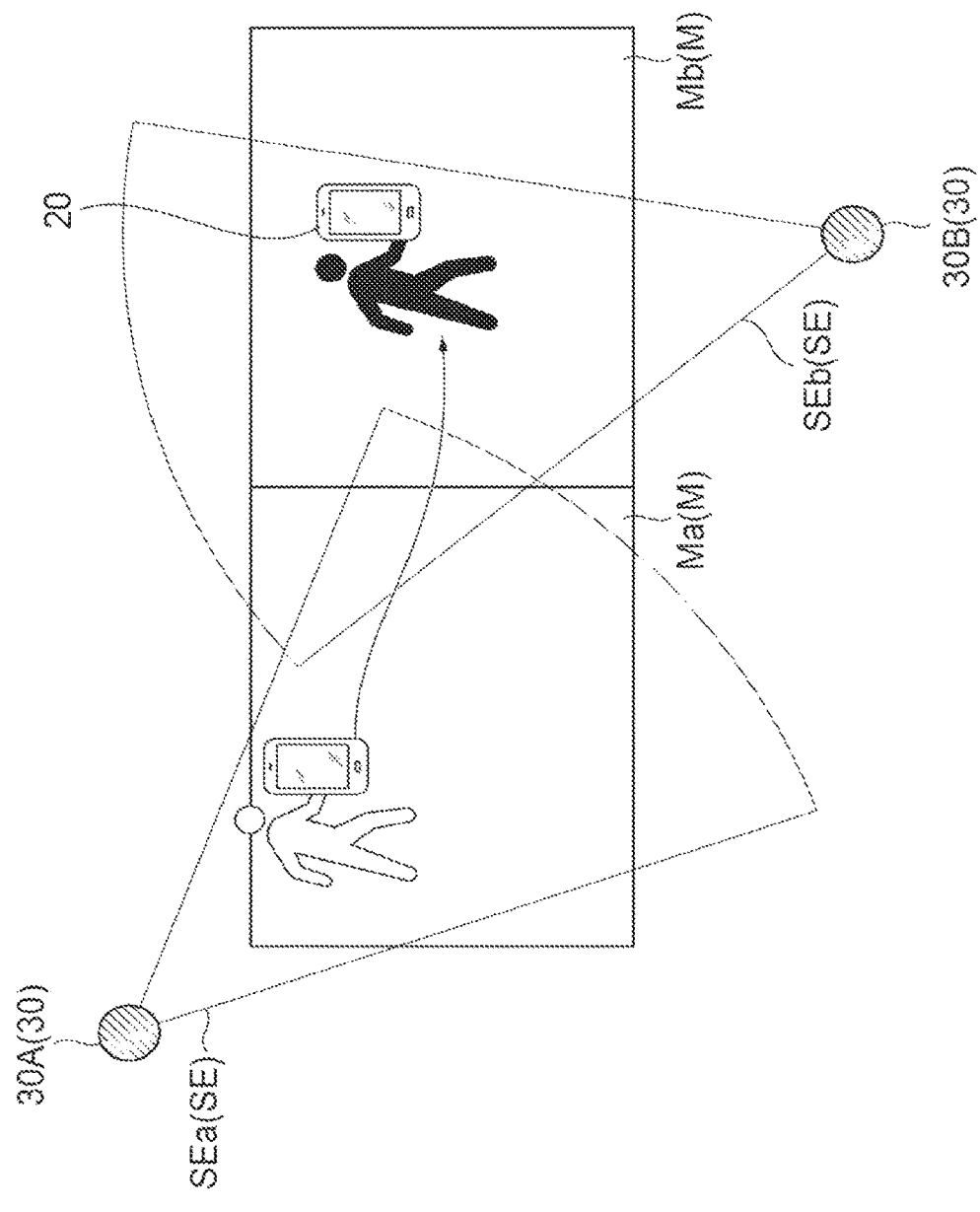
FIG. 2 is a diagram illustrating an outline of population estimation processing using a location registration signal.

FIG. 2 is a diagram showing an outline of the population estimation processing using the location registration signal. Each base station 30 has a plurality of sectors SE, which are units obtained by dividing a cell that is a coverage area (i.e., a range of radio waves). Each sector SE has a fan shape centered on the base station 30. In the example of FIG. 2, a user carrying the mobile terminal 20 moves from an area covered by a sector SEa of a base station 30A to an area covered by a sector SEb of another base station 30B. In this case, when the user is in the sector SEa, a location registration signal is transmitted from the mobile terminal 20 of the user to the base station 30A. Similarly, when the user is in the sector SEb, a location registration signal is transmitted from the mobile terminal 20 of the user to the base station 30B. Upon receiving the location registration signal from the mobile terminal 20, each base station 30 acquires information (hereinafter referred to as "location registration signal data") indicating: time information indicating the time at which the location registration signal was transmitted; identification information for identifying the mobile terminal 20 (i.e., the user of the mobile terminal 20) from which the location registration signal was transmitted; and a stay area of the mobile terminal 20 from which the location registration signal was transmitted. The information indicating the stay area includes, for example, base station information and sector information indicating the base station 30 and the sector SE in which the location registration signal was received, and a transmission delay amount (i.e., a transmission time from when the location registration signal is transmitted from the mobile terminal 20 to when the location registration signal is received by the base station 30A). Each base station 30 transmits the location registration signals acquired so far to the data aggregation server 40 at a predetermined time, for example. Accordingly, the location registration signals acquired in each base station 30 are aggregated in the data aggregation server 40.

Figure 3:
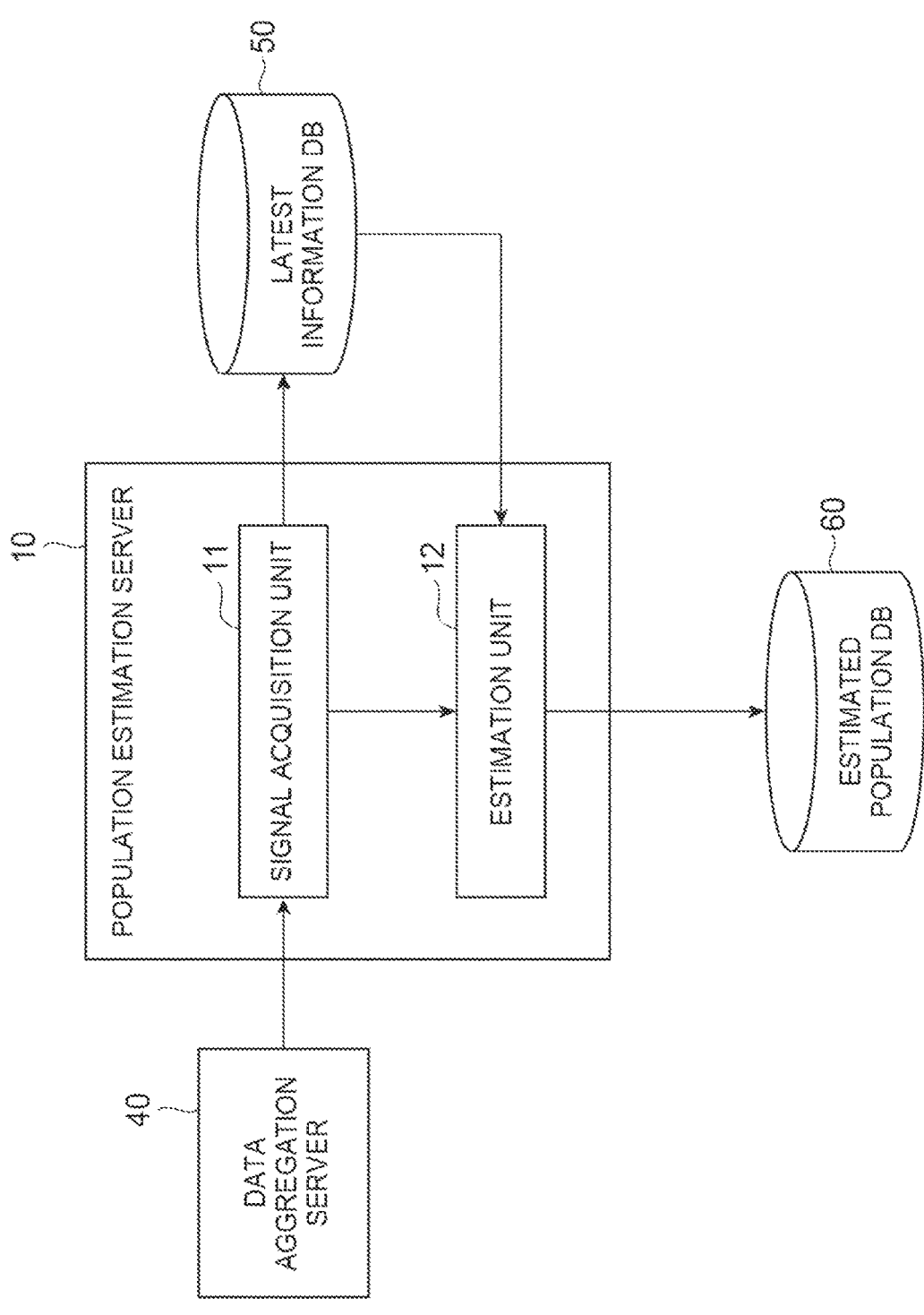
FIG. 3 is a diagram illustrating a functional configuration of the population estimation server.

The population estimation server 10 estimates a population for each area (in this embodiment, a mesh of four sides of 500 m) based on the location registration signals aggregated by the data aggregation server 40. FIG. 3 is a diagram illustrating a functional configuration of the population estimation server 10. The population estimation server 10 includes a signal acquisition unit 11 and an estimation unit 12.

The signal acquisition unit 11 acquires a location registration signal transmitted from the mobile terminal 20. As described above, the location registration signal is acquired periodically (e.g., once every 60 minutes) from the mobile terminal 20 staying (stationary) in a certain area. In the present embodiment, the signal acquisition unit 11 acquires the location registration signal data aggregated by the data aggregation server 40. In addition, the signal acquisition unit 11 stores the latest information for each mobile terminal 20 in the latest information DB 50. The latest information indicates the time at which the latest location registration signal is transmitted and the stay position of the mobile terminal 20 specified by the latest location registration signal. For example, each time a new location registration signal data is acquired from each mobile terminal 20, the signal acquisition unit 11 stores the location registration signal data in the latest information DB 50 as the latest information. The latest information stored in the latest information DB 50 is referred to by the estimation unit 12.

FIG. 4 is a diagram illustrating an example of the latest information stored in the latest information DB 50. Each of the records shown in FIG. 4 corresponds to one latest information (i.e., one location registration signal data). In the example of FIG. 4, the latest information (location registration signal data) corresponding to the first record indicates that the location registration signal is transmitted from the mobile terminal 20 owned by the user identified by the user ID "A" at the time "17:42:03 on Oct. 12, 2019". The user ID is, for example, a telephone number with which the user has contracted with the mobile network operator. Further, the latest information indicates that the user stayed in the stay area specified by "base station X, sector L, transmission delay amount 100 ms".

The estimation unit 12 aggregates the acquired location registration signals for each area (mesh in this embodiment) and for each estimation-unit-period (period divided every 10 minutes in this embodiment) and estimates the population for each area and for each estimation-unit-period based on an aggregation result. The estimation unit 12 stores the population (estimated population) for each area and for each estimation-unit-period in the estimated population DB 60. As a result, an operator, or the like may refer to the estimated population of the desired area or period by accessing the estimated population DB 60.

For example, the estimation unit 12 performs the following processing. Focusing on a specific location registration signal data, the approximate location of the mobile terminal 20 can be estimated from the base station information, the sector information, and the transmission delay amount included in the specific location registration signal data. More specifically, it is possible to estimate that the mobile terminal 20 has stayed at a position away from the base station 30 by a distance estimated based on the transmission delay amount in the sector SE of the base station 30 specified by the base station information and the sector information. That is, the estimation unit 12 can specify a stay area at a certain time (time indicated by the time information included in the location registration signal data) of the mobile terminal from the base station information, the sector information, and the transmission delay amount included in the location registration signal data. Here, the stay area can be specified, for example, as an annular fan-shaped (Baumkuchen-shaped) area centered on the base station 30 (a partial area of the sector SE).

Subsequently, the estimation unit 12 calculates an overlap ratio between the stay area thus specified in this manner and each mesh M (see FIG. 2), which is a unit area of the population estimation, and proportionally distributes the population (the number of location registration signals) in each mesh M based on the calculated overlap ratio.

Subsequently, the estimation unit 12 multiplies the aggregation result for each mesh M (the total number of location registration signals for each estimation-unit-period) by a predetermined enlargement coefficient. The enlargement coefficient can be calculated in advance for each attribute (gender or the like), age, and address e.g., city, ward, town, or village unit) of the user, for example. The enlargement coefficient is a ratio (N2/N1) of an actual population (N2) to an existence probability of the mobile terminal 20 (i.e., an expected value N1 of the number of location registration signals acquired in a section of the city, ward, town, or village unit). Such an enlargement coefficient can be calculated by, for example, by comparing the number of location registration signals acquired per estimation-unit-period in a midnight time zone (i.e., a time zone in which the movement of people is small) with the population registered in the basic resident register or the like in units of cities, wards, towns, and villages.

Here, the area (mesh M), that is the unit area for estimation, may include a place for holding an event, such as a classical concert or a live concert, for which the mobile terminal 20 is required to be turned off during the event. In such an area, although there are many users (users carrying the mobile terminals 20) at the event site, the mobile terminals 20 of these users are turned off during the event, and thus the location registration signals corresponding to these users are not acquired. Furthermore, since these users simultaneously turn on the power of the mobile terminal 20 after the end of the event, a large number of location registration signals are immediately transmitted in a burst manner in a short period of time.

Figure 5:
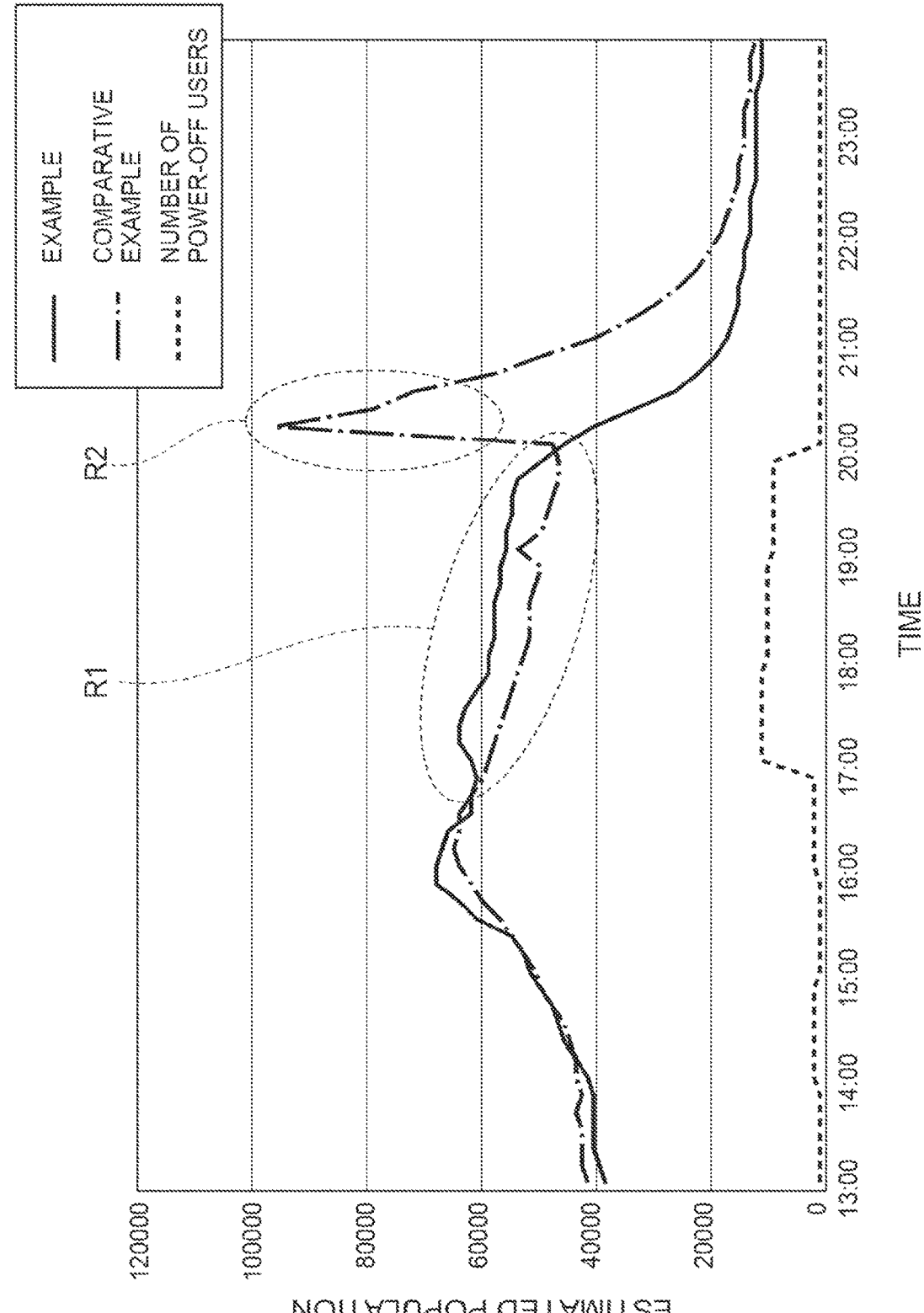
FIG. 5 is a diagram illustrating an example of population estimation results of each of an example and a comparative example.

FIG. 5 is a diagram illustrating an example of a population estimation result of each of the example and the comparative example for a particular target area (mesh) including a place (e.g., the above-described event site or the like) having the above-described characteristics. In FIG. 5, the horizontal axis indicates time and the vertical axis indicates the estimated population (number of persons). In the example, correction processing of the estimation unit 12 described later is performed. In the comparative example, the correction processing is not performed (i.e., only the aggregation process based on the location registration signal described above is performed).

First, a comparative example indicated by one dot chain line in FIG. 5 is described. A dotted line in FIG. 5 indicates the number of users who have turned off the mobile terminal 20 (i.e., the number of the mobile terminals 20 that are present in the target area and in the power-off state). The period R1 is a period during an event. More specifically, in the example shown in FIG. 5, the event requiring the mobile terminal 20 to be powered off is held in the period R1 from 17:00 to 20:00 at the event site in the target area. Therefore, there are more power-off users in the period R1 than in other periods. In the period R1, the number of location registration signals periodically transmitted from the mobile terminal 20 is reduced by the number of power-off users. As a result, in the period R1, the estimated population of the target area is calculated to be lower than the original population (i.e., the number of people including the number of power-off users).

In a short period (period R2) after 20:00 immediately after the end of the event, the power-off users simultaneously turn on the power of the mobile terminal 20. Therefore, more location registration signals are acquired in the period R2 than in the normal case. More specifically, in the normal case, a location registration signal is transmitted at a timing when a particular user enters a location registration area including a target area, and thereafter a location registration signal is transmitted periodically every 60 minutes based on the transmission time point. Here, since the timing at which the user enters the location registration area varies depending on the user, it is assumed that the timing at which location registration signals are transmitted from a plurality of users (mobile terminals 20) in the location registration area is uniformly distributed. In addition, the enlargement coefficient described above is based on the premise that timings at which location registration signals are transmitted from a plurality of users (mobile terminals 20) are uniformly distributed. Therefore, when location registration signals are transmitted in a burst manner in a short period of time from many mobile terminals 20, such as in the period R2 described above, the estimated population of the target area in the period R2 is calculated to be larger than the actual population. That is, as shown in FIG. 5, the estimated population in the period R2 fluctuates upward in a pulsed manner.

Figure 6:
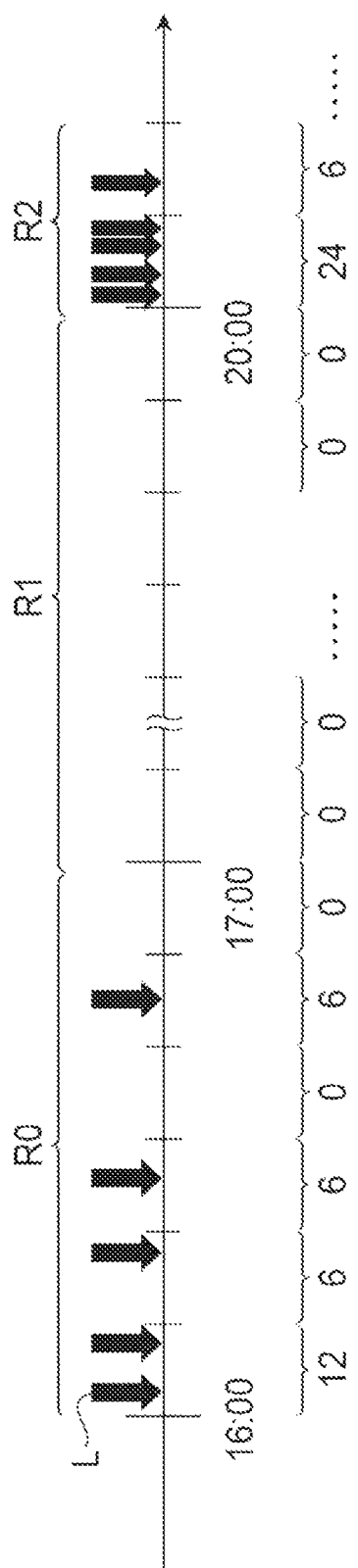
FIG. 6 is a diagram for explaining the processing of the comparative example.

FIG. 6 is a diagram schematically illustrating the processing of the comparative example (i.e., the timing at which a location registration signal is acquired in the comparative example). In FIG. 6, only location registration signals from a limited number of mobile terminals 20 are shown for ease of explanation. The enlargement coefficient is set to "6". The period R0 in FIG. 6 is a normal period before the start of the event (i.e., a period in which there is no power-off user involved in the event). In the period R0, as described above, the timings at which location registration signals are transmitted from a plurality of users (mobile terminals 20) are randomly distributed. Therefore, in the period R0, a relatively accurate estimated population can be obtained even by the comparative example (processing not including the correction processing to be described later). On the other hand, in the period R1 in which the number of power-off users increases during the event, as described above, since the location registration signal from the power-off user's mobile terminal 20 is interrupted, the estimated population fluctuates downward. Further, in the period R2 immediately after the event is held, as described above, since the location registration signal is transmitted in a burst manner from many mobile terminals 20 whose power supplies are turned on at the same timing, the estimated population fluctuates upward.

The example (i.e., the population estimation server 10 according to the present embodiment) is configured to perform the following correction processing in order to solve the problem of the comparative example as described above (i.e., the downward fluctuation of the estimated population in the period R1 and the upward fluctuation of the estimated population in the period R2).

Figure 7:
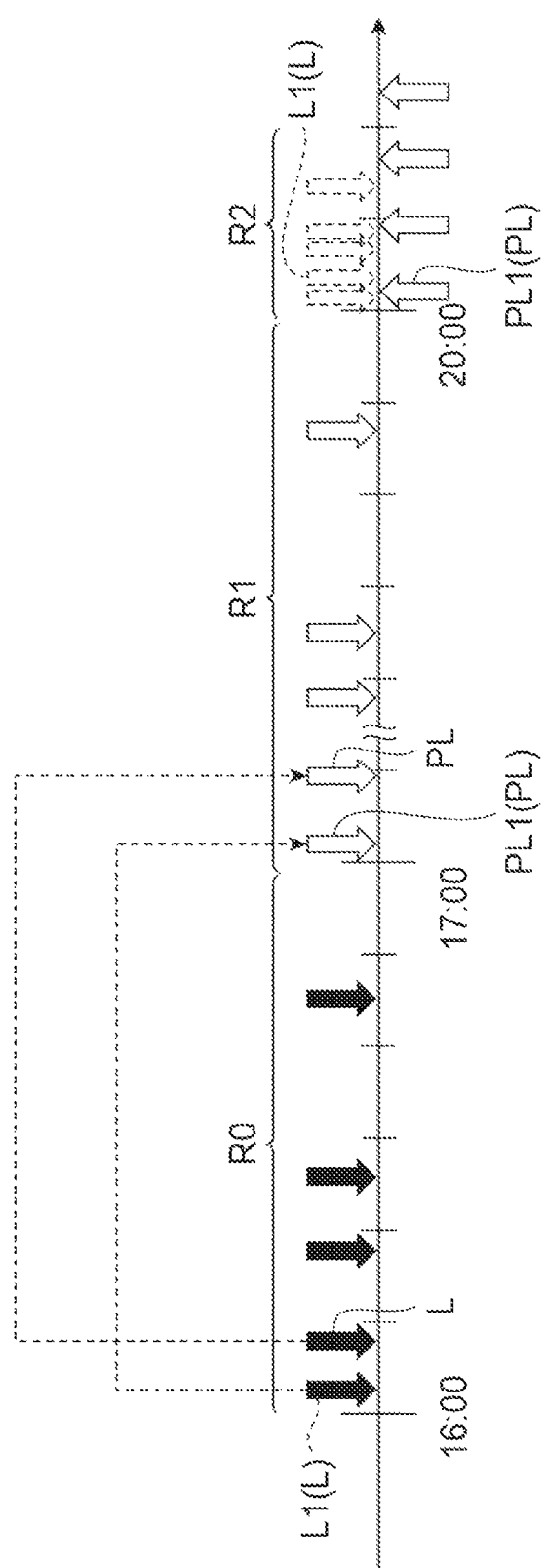
FIG. 7 is a diagram illustrating correction processing according to the embodiment.

FIG. 7 is a diagram that schematically illustrates the correction processing according to the example. In the example, after acquiring a location registration signal L from a mobile terminal 20 (first mobile terminal) staying in a target area (first area), when an absent period (in this example, a period including a period R1) occurs in which the location registration signal L is not acquired from the mobile terminal 20, the estimation unit 12 interpolates pseudo signals PL associated with the mobile terminal 20 in the absent period. Here, the absent period is a period longer than the transmission interval (60 minutes in this embodiment) of the location registration signal in the normal state.

In FIG. 7, the location registration signal L1 indicates a location registration signal acquired by the mobile terminal 20 of the user identifier "A". In the example of FIG. 7, since the power supply of the mobile terminal 20 is turned off during the period R1 (the period from 17:00 to 20:00 during which the event is held), the location registration signal L1 is not transmitted from the mobile terminal 20 until the location registration signal L1 is transmitted from the mobile terminal 20 during the period R2 immediately after the end of the event (here, as an example, 20:03) after the location registration signal L1 is transmitted from the mobile terminal 20 at 16:02. In this case, the estimation unit 12 interpolates the location registration signal (i.e., the pseudo signal PL), that should have been acquired if the power of the mobile terminal 20 is turned on, in the absent period for the mobile terminal 20. In the example of FIG. 7, the estimation unit 12 interpolates the pseudo signals PL1 associated with the mobile terminal 20 of the user identifier "A" at 17:02, 18:02, and 19:02. Here, "interpolating the pseudo signal PL" means that the location registration signal L is not actually obtained, but the aggregation processing described above is performed under the assumption that the location registration signal L is obtained.

In addition, as illustrated in FIG. 7, the estimation unit 12 excludes the location registration signal L that is first transmitted from the mobile terminal 20 after the absent period from the aggregation target. As a result, it is possible to solve the problem in the comparative example that the estimated population fluctuates upward in the period R2. However, if the first location registration signal after the absent period is simply excluded from the aggregation target in this way, one location registration signal is lost for each mobile terminal 20 whose power is turned on after the absent period. Therefore, in the period R2 after the absent period, although it is possible to suppress the pulse-like upward swing as in the comparative example, there may be a problem in that the estimated population is calculated to be lower than the actual value. Therefore, the estimation unit 12 may further interpolate one pseudo signal PL after the absent period. That is, the estimation unit 12 may perform interpolation processing of the pseudo signal PL in the absent period even after the absent period while excluding the actual location registration signal L occurring after the absent period from the aggregation target. In the example of FIG. 7, the estimation unit 12 interpolates the pseudo signals PL1 in the absent period (17:02, 18:02, and 19:02) for the mobile terminal 20 of the user identifier "A", and also interpolates the pseudo signal PL1 at the first timing (20:02) after the absent period. According to the configuration described above, it is possible to prevent the occurrence of a pulse-like upward swing of the estimated population in the period R2, and to avoid a problem in which the estimated population is calculated to be lower than the actual value in a certain period after the absent period.

Note that the estimation unit 12 may not exclude the location registration signals of the second and subsequent times after the absent period of each mobile terminal 20 from the aggregation target. This is due to the following reason. That is, after an absent period (i.e., after the end of the event), each user leaves the event site and is scattered in different areas. Then, a location registration signal is transmitted from the mobile terminal 20 of each user at the timing of crossing the location registration area, and thereafter, location registration signals are transmitted at regular time intervals (60 minutes) based on this timing. Therefore, after a while from the absent period, as in the normal period (period R0) before the absent period, the timing at which the location registration signal is transmitted from each mobile terminal 20 is considered to vary naturally. Therefore, the estimation unit 12 may exclude, from the aggregation target, only the first location registration signal after the absent period in which there is a high probability that the transmission timing of the location registration signal is highly likely to match among the plurality of mobile terminals 20.

According to the correction processing of the estimation unit 12 described above, as indicated by the solid line in FIG. 5, it is possible to suppress the downward fluctuation of the estimated population in the absent period (mainly the period R1) and to suppress the rapid upward fluctuation of the estimated population in the period R2 after the absent period (i.e., after the end of the event).

The estimation unit 12 may determine whether an absent period has occurred for each mobile terminal 20 in the following manner. For example, the estimation unit 12 determines whether an absent period has occurred for each mobile terminal 20 by referring to the latest information stored in the latest information DB 50. In the example of FIG. 7, when the location registration signal L1 transmitted from the mobile terminal 20 having the user identifier "A" is obtained at 20:03, the estimation unit 12 refers to the latest information of the mobile terminal 20 stored in the latest information DB 50. Accordingly, the estimation unit 12 can specify that the latest location registration signal L1 of the mobile terminal 20 (here, the location registration signal L1 acquired immediately before the location registration signal L1 at 20:03) is transmitted at 16:02. Then, the estimation unit 12 calculates the time difference (here, 3 hours 59 minutes) between the transmission time (20:03) of the current location registration signal L1 and the transmission time (16:02) of the previous location registration signal L1, and if the time difference is longer than the normal transmission interval (60 minutes), it can be determined that an absent period has occurred for the mobile terminal 20. As described above, by storing the latest information (latest location registration signal data) for each mobile terminal 20 in the latest information DB 50, the estimation unit 12 can appropriately and easily determine whether correction processing is required (i.e., whether there is an absent period).

Here, in a case where the absent period of a particular mobile terminal 20 is too long (for example, a case where the absent period is longer than twice the event period), there is a possibility that a factor that the location registration signal L is not obtained from the mobile terminal 20 in the absent period is a factor other than the power-off due to the event. Furthermore, the interpolation of the pseudo signal PL in the absent period assumes that the power of the mobile terminal 20 is turned off due to the event in the absent period. Therefore, if the absent period is too long as described above, that is, if the probability that the mobile terminal 20 whose power is turned off in the absent period stays in the target area (that is, the user of the mobile terminal 20 stays in the event site) is not high, the estimation unit 12 may not perform the interpolation of the pseudo signal PL described above. That is, the estimation unit 12 may interpolate the pseudo signal PL when a condition that the absent period is equal to or less than a predetermined threshold period (e.g., 6 hours which is twice as long as an event period in the present embodiment) is satisfied, and may not interpolate the pseudo signal PL when the absent period does not satisfy the condition. According to the above configuration, since the pseudo signal PL is interpolated only when the probability that the mobile terminal 20 stays in the target area in the power-off state in the absent period is high, it is possible to improve the accuracy of the population estimation.

The estimation unit 12 may interpolate the pseudo signal PL associated with the target area when the stay area of the mobile terminal 20 specified by the location registration signal L first transmitted from the mobile terminal 20 after the absent period is identical to the target area or an area within a predetermined threshold distance from the target area (e.g., a mesh adjacent to the target area). In a case where the stay area of the mobile terminal 20 specified first after the absent period is an area very far from the target area or the like, it cannot be said that the probability of the mobile terminal 20 continuing to stay in the target area during the absent period is high. Therefore, it is possible to improve the accuracy of the population estimation by interpolating the pseudo signal PL associated with the target area only when the above condition is satisfied (i.e., when there is a high probability that the mobile terminal 20 stayed in the target area in the power-off state in the absent period).

Next, an example of the operation of the population estimation server 10 is described with reference to the flowchart of FIG. 8.

In step S1, the signal acquisition unit 11 acquires a location registration signal transmitted from the mobile terminal 20 owned by the user staying in each area (mesh). For example, the signal acquisition unit 11 acquires the location registration signal data aggregated in the data aggregation server 40. As an example, the signal acquisition unit 11 periodically acquires the location registration signal data from the data aggregation server 40 at predetermined time intervals (e.g., at intervals of several minutes). In a case where real-time processing of the population estimation server 10 (i.e., real-time population estimation) is required, the frequency at which the data aggregation server 40 acquires the location registration data from each base station 30 and the frequency at which the signal acquisition unit 11 acquires the location registration signal data from the data aggregation server 40 may be increased.

In step S2, the estimation unit 12 performs correction processing for each area and for each mobile terminal 20. The correction processing in step S2 also includes a process of determining whether the correction processing is necessary. As described above, the area in which the correction processing is effective is an area including a place where many users congregate and where an event is held in which it is necessary to turn off the power supply of the mobile terminal 20. Therefore, the estimation unit 12 may extract an area (mesh) to be subjected to the correction processing in advance using the conditions described above or the like and perform the correction processing only on the extracted specific area. The period in which the correction processing is effective is a period in which an event as described above is held. Therefore, the estimation unit 12 may extract a period to be subjected to the correction processing in advance using the conditions described above or the like and perform the correction processing only on the extracted specific period. Details of the processing in step S2 will be described later.

In step S3, the estimation unit 12 calculates an estimated population for each area and for each estimation-unit-period by performing aggregation processing based on the data in which the correction processing in step S2 (specifically, interpolation of a pseudo signal in an absent period, exclusion of a first location registration signal after the absent period, and the like) is reflected.

An example of the processing of step S2 of FIG. 8 will be described with reference to FIG. 9. As described above, the processing of step S2 is performed for each target area and each mobile terminal 20. The flowchart shown in FIG. 9 shows a process for a mobile terminal 20. The estimation unit 12 may perform the process of the flowchart shown in FIG. 9 for each mobile terminal 20 to be processed.

In step S21, the estimation unit 12 determines whether or not an absent period has occurred by referring to the latest information DB 50. If the determination result is "YES", the estimation unit 12 performs the determination processing of step S22. If the determination result is "NO", the estimation unit 12 does not perform the correction processing for the mobile terminal 20.

In step S22, the estimation unit 12 determines whether the absent period is equal to or less than a threshold period (e.g., 6 hours). If the determination result is "YES", the estimation unit 12 performs the determination processing of step S23. If the determination result is "NO", the estimation unit 12 does not perform the correction processing for the mobile terminal 20.

In step S23, the estimation unit 12 determines whether or not the stay area of the mobile terminal 20 specified by the location registration signal L (location registration signal data) first transmitted from the mobile terminal 20 after the absent period is identical to the target area or an area within a predetermined threshold distance from the target area (e.g., a mesh adjacent to the target area). If the determination result is "YES", the estimation unit 12 performs the processing of steps S24 and S25. If the determination result is "NO", the estimation unit 12 does not perform the correction processing for the mobile terminal 20.

In step S24, the estimation unit 12 interpolates the pseudo signal in the absent period. In the example of FIG. 7, the estimation unit 12 interpolates three pseudo signals PL1 in the absent period (17:02, 18:02, and 19:02) for the mobile terminal 20 having the user identifier "A". Such a process is also performed for the other similar mobile terminals 20, thereby suppressing the downward fluctuation of the estimated population in the absent period (period R1 in FIGS. 5 to 7).

In step S25, the estimation unit 12 excludes the first location registration signal L after the absent period from the aggregation target. As a result, the rapid upward fluctuation of the estimated population in the period immediately following the absent period (period R2 in FIGS. 5 to 7) is suppressed. Note that the estimation unit 12 may also interpolate the pseudo signal PL1 at the first timing (20:02) after the absent period to suppress the downward fluctuation of the estimated population by an amount corresponding to the exclusion of the first location registration signal L.

Figure 8:
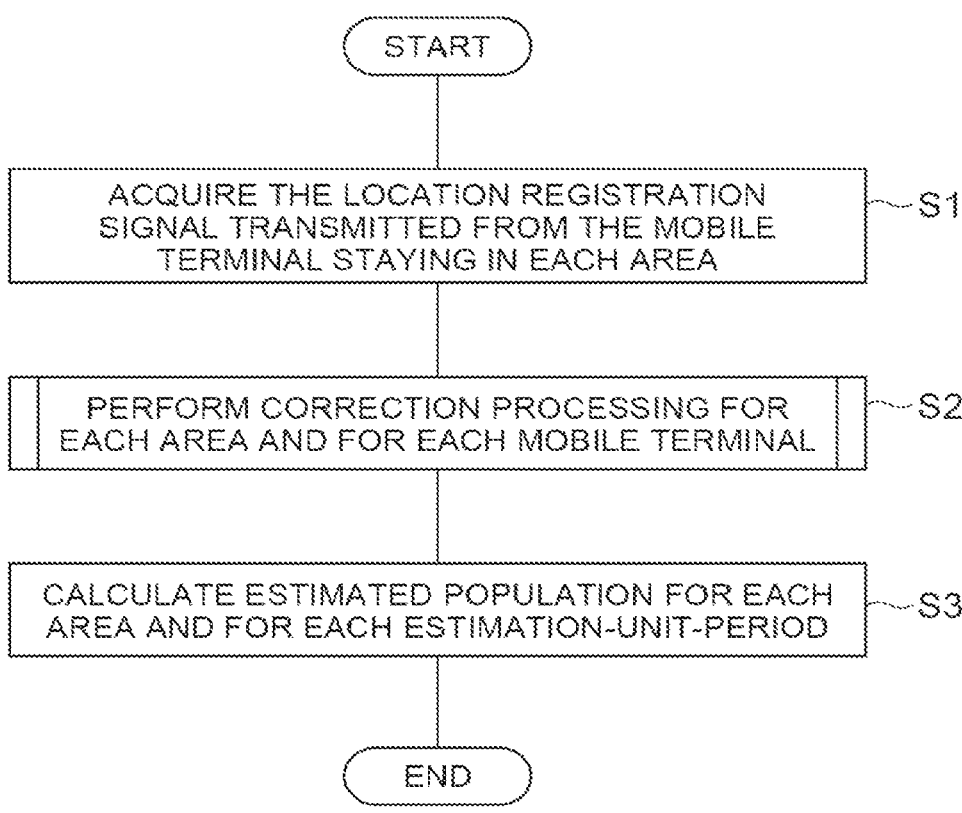
FIG. 8 is a flowchart showing an example of the operation of the population estimation server.
Figure 9:
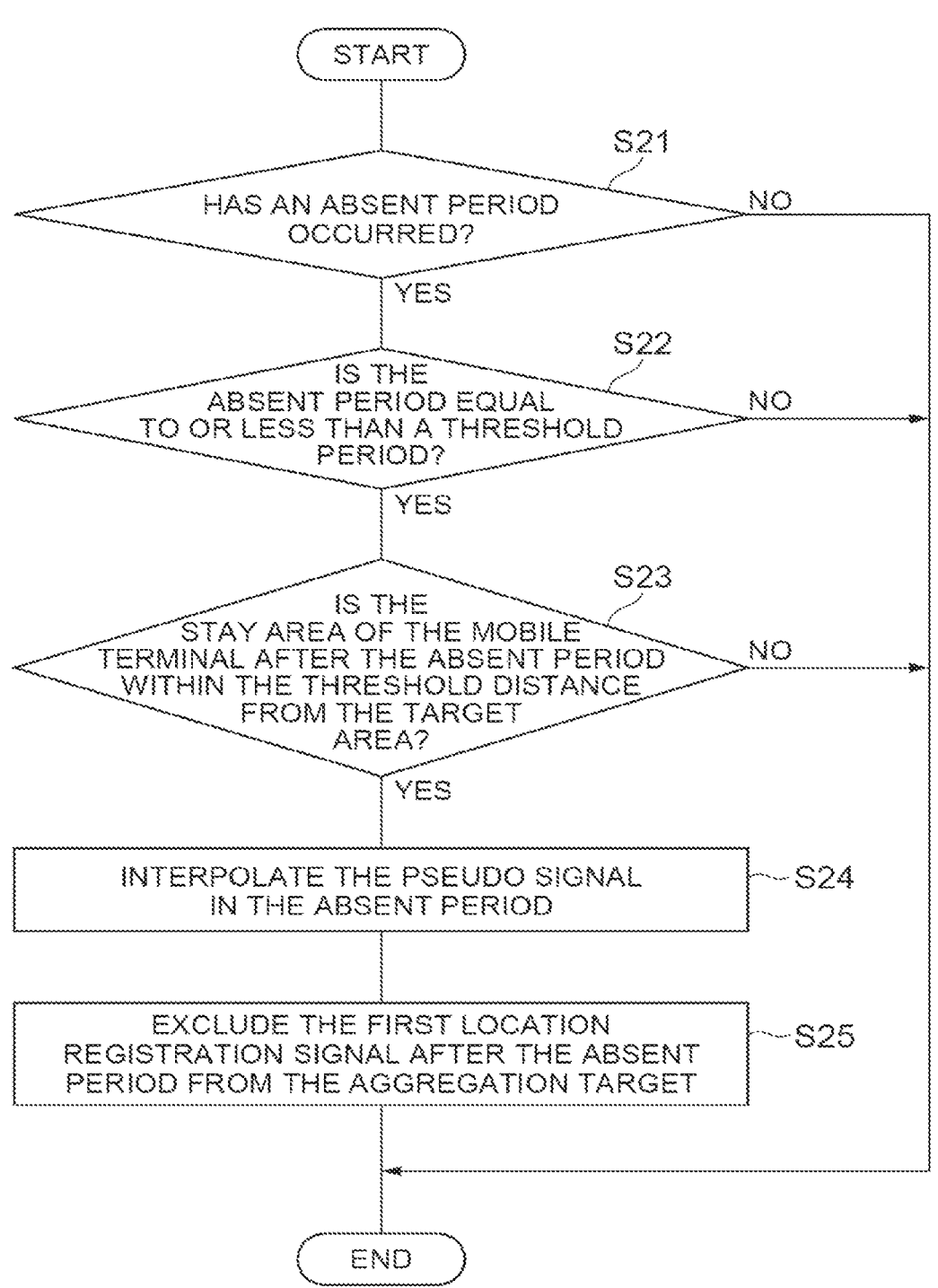
FIG. 9 is a flowchart showing an example of processing in step S2 of FIG. 8.
Figure 10:
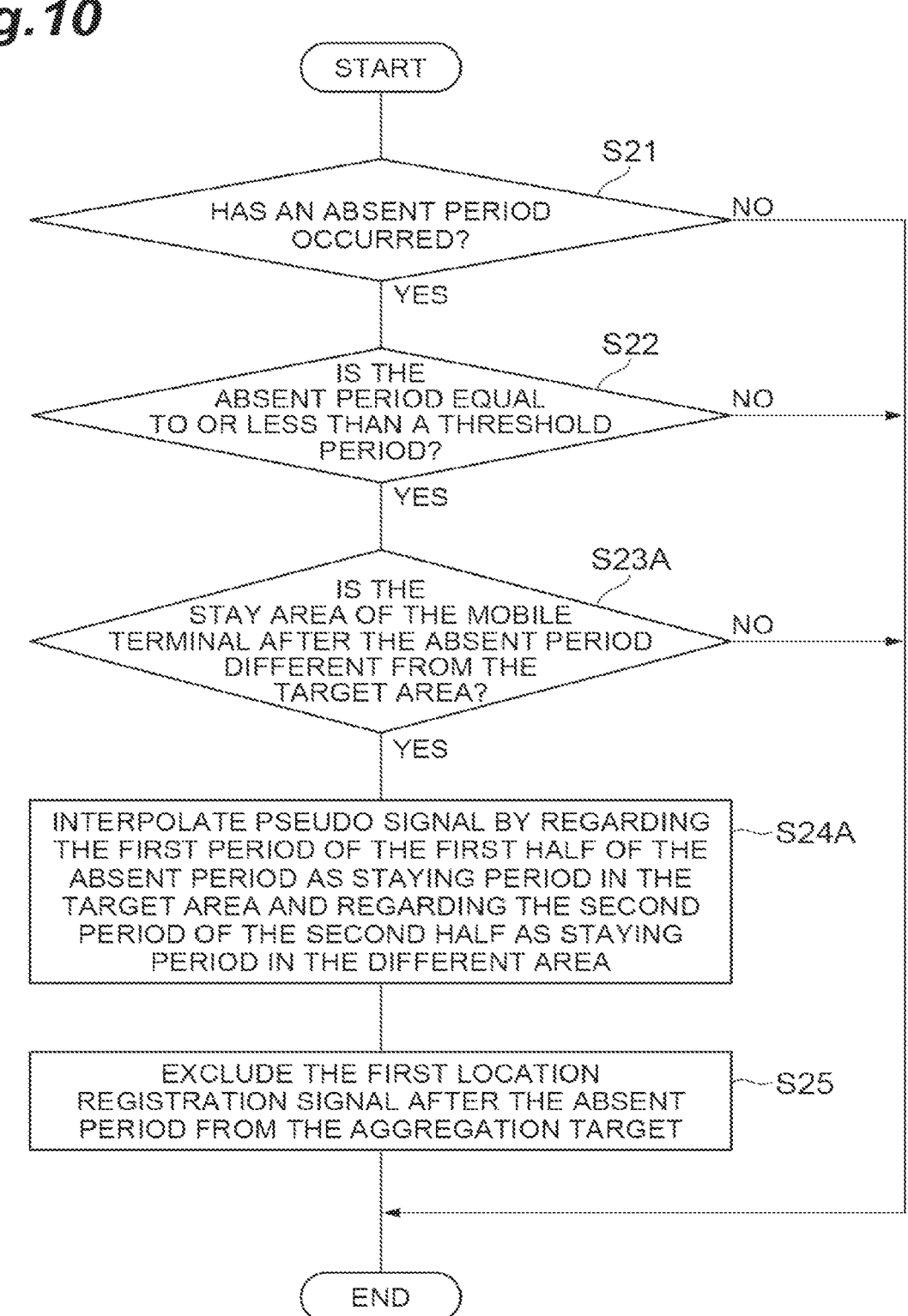
FIG. 10 is a flowchart showing a modification example of the processing in step S2 of FIG. 8.

Next, a modification example of the process of step S2 of FIG. 8 is described with reference to FIGS. 10 and 11. The flowchart of the modification example of FIG. 10 differs from the flowchart of FIG. 9 in that steps S23A and S24A are included instead of steps S23 and S24 in FIG. 9, and the other items are identical to the flowchart of FIG. 9. The processing (steps S23A and S24A) of the modification example can be used together with the processing of steps S23 and S24 in FIG. 9. For example, when the determination result of step S23 in FIG. 9 is "NO", the determination processing of step S23A can be performed.

In the modification example, in step S23A, the estimation unit 12 determines whether or not the stay area of the mobile terminal 20 specified by the location registration signal L first transmitted from the mobile terminal 20 after the absent period is an area (second area) different from the target area (first area). When the determination result is "YES", the estimation unit 12 performs the processing of steps S24A and S25. When the determination result is "NO", the estimation unit 12 does not perform the correction processing for the mobile terminal 20.

In step S24A, the estimation unit 12 divides the absent period into a first period and a second period after the first period. The estimation unit 12 then interpolates the pseudo signal associated with the first area for the first period and interpolates the pseudo signal associated with the second area for the second period.

Figure 11:
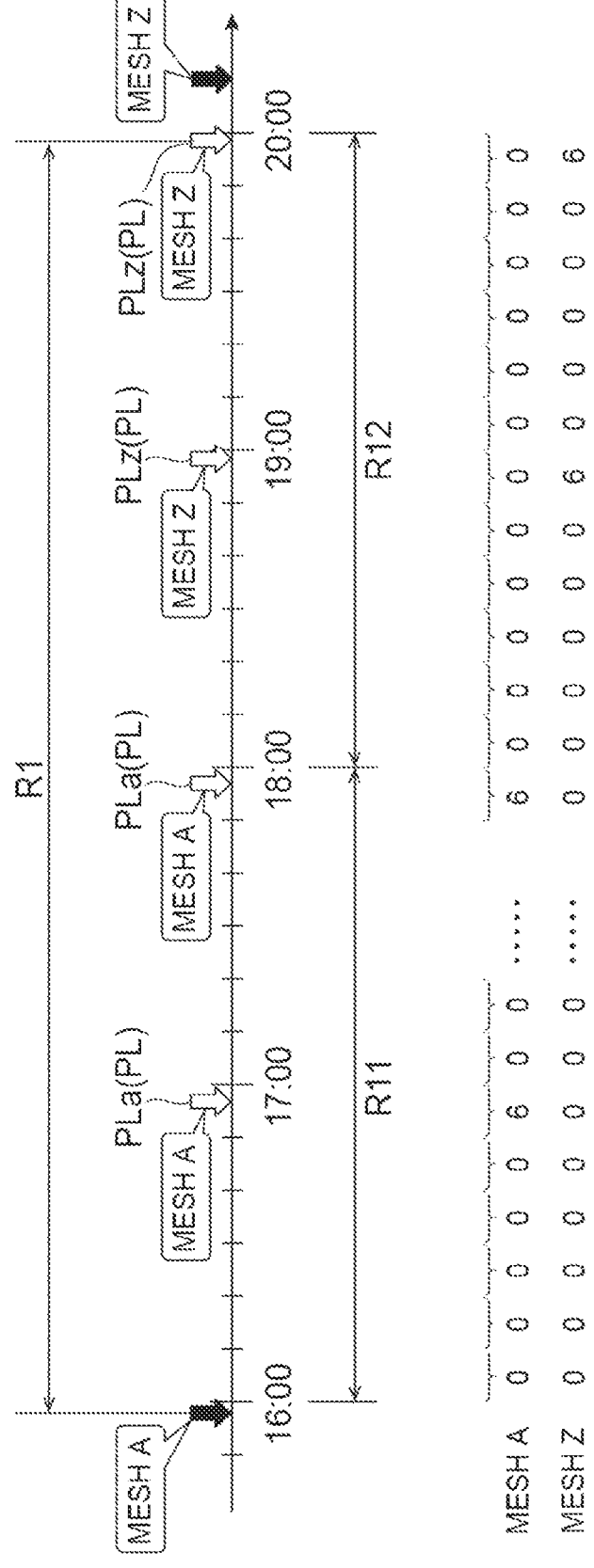
FIG. 11 is a diagram illustrating a modification example of the processing in step S2 of FIG. 8.

FIG. 11 shows an example in which a user of a particular mobile terminal 20 moves from a mesh A (first area) to a mesh Z (second area) in an absent period (period R1). In this example, the estimation unit 12 divides the absent period (period R1) into a first period R11 which is first half of the period R1 and a second period R12 which is second half of the period R1. Then, the estimation unit 12 interpolates the pseudo signals PLa associated with the mesh A for the first period R11 and interpolates the pseudo signals PLz associated with the mesh Z for the second period R12. According to the modification example described above, even if the stay areas (meshes) of the mobile terminal 20 specified based on the location registration signal are different from each other before and after the absent period, it is possible to appropriately correct the estimated population by interpolating the pseudo signal PL assuming that the mobile terminal 20 stays in the mesh A in the first half of the absent period and stays in the mesh Z in the second half of the absent period.

For example, according to the population estimation server 10 described above, when an absent period such as a period in which the power supply of the mobile terminal 20 is turned off occurs (e.g., a period including the period R1 in FIGS. 5 to 7), the location registration signal that would have been acquired if the power supply of the mobile terminal 20 had been turned on is interpolated as the pseudo signal PL. As a result, it is possible to reduce the degree to which the estimated population is calculated to be smaller than the actual population (number of staying people) in the absent period. In addition, in a case where the absent period is a period during an event in which the mobile terminal is required to be turned off or the like, there is a possibility that the many mobile terminals 20 are turned on simultaneously in an estimation-unit-period (for example, an estimation-unit-period included in the period R2 in FIGS. 5 to 7) after the end of the absent period (that is, after the end of the event). In this case, the estimated population in the estimation-unit-period is calculated more than the actual population due to the location registration signals transmitted in bursts from the plurality of mobile terminals 20. On the other hand, according to the population estimation server 10, since the location registration signal transmitted first after the absent period is excluded from the aggregation target, it is possible to reduce the degree to which the estimated population in the estimation-unit-period is calculated more than the actual population. Therefore, according to the population estimation server 10, it is possible to reduce the estimation error due to the influence of the power-off of the mobile terminal 20.

In the embodiment described above, the case where the population estimation is performed based on the location registration signal from the mobile terminal 20 has been described as an example, but a signal (information) other than the location registration signal may be used. In particular, the signal may be a signal that is transmitted at a timing when the mobile terminal 20 is turned on and transmitted periodically at predetermined time intervals in a state where the mobile terminal 20 is turned on, and the location (position) of the mobile terminal 20 may be specified based on the signal. For example, in a case where the mobile terminal 20 is configured to perform positioning using GPS or the like at the above-described timing, a positioning signal indicating a result of the positioning may be used instead of the location registration signal of the above-described embodiment. In this case, the stay area (mesh) of the mobile terminal 20 may be determined based on the position information (latitude and longitude) included in the positioning signal.

The timing at which the pseudo signal is interpolated is not limited to once every 60 minutes. For example, the timing at which the pseudo signal is interpolated may be determined according to the frequency of occurrence of the location registration signal in the normal period (e.g., the period R0 in FIGS. 6 and 7). That is, since the pseudo signal is intended to compensate for the location registration signal that would be acquired if the mobile terminal 20 is not turned off in the absent period, the estimation unit 12 may interpolate the pseudo signal at the same frequency as in the normal period.

The block diagrams used in the description of the embodiment show blocks in functional units. These functional blocks (components) are realized in any combination of at least one of hardware and software. Further, a method of realizing each functional block is not particularly limited. That is, each functional block may be realized using a physically or logically coupled device, or may be realized by directly or indirectly connecting two or more physically or logically separate devices (e.g., using a wired scheme, a wireless scheme, or the like) and using such a plurality of devices. The functional block may be implemented by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 12:
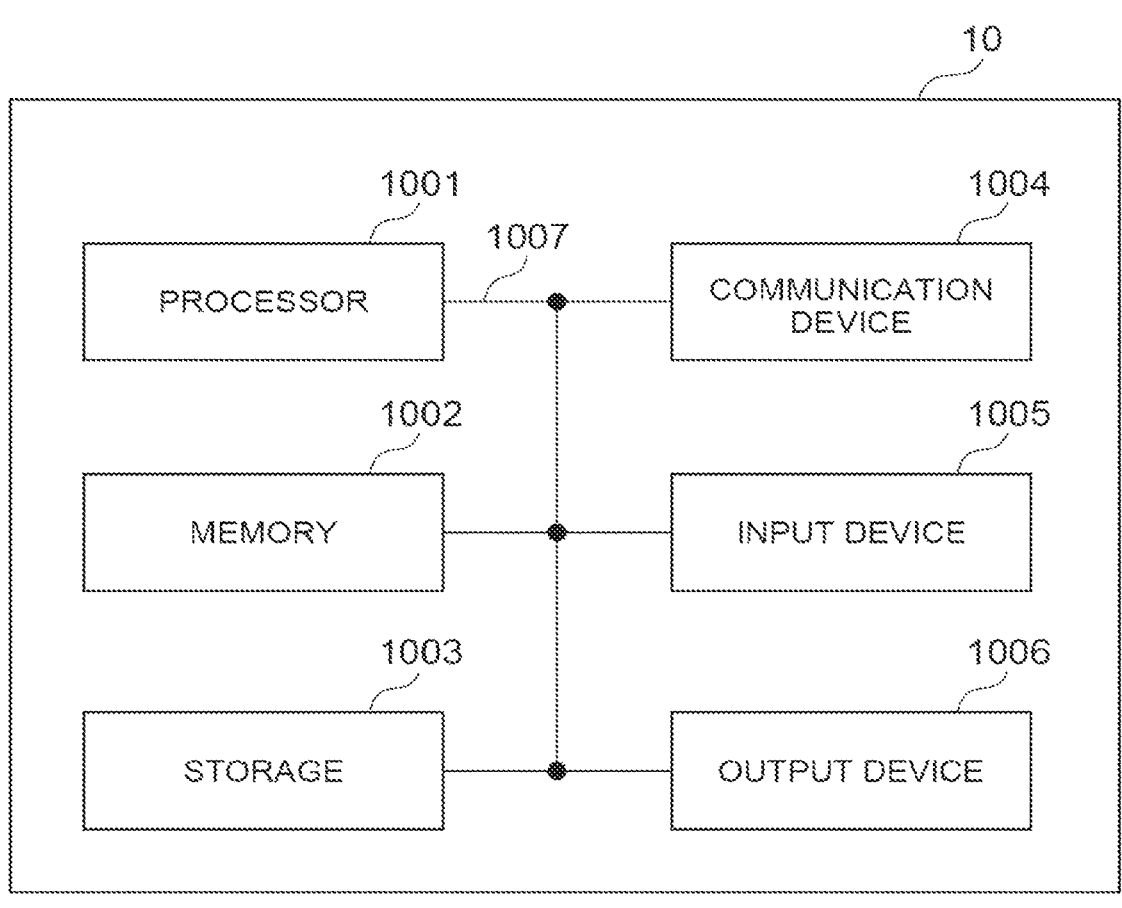
FIG. 12 is a diagram illustrating an example of a hardware configuration of the population estimation server.

For example, the population estimation device 10 according to an embodiment of the present invention may function as a computer that performs an information processing method of the present disclosure. FIG. 12 is a diagram illustrating an example of a hardware configuration of the population estimation device 10 according to the embodiment of the present disclosure. The population estimation device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the population estimation device 10 may include one or more of the devices illustrated in FIG. 12 or may be configured without including some of the devices.

Each function in the population estimation device 10 is realized by loading predetermined software (a program) into hardware such as the processor 1001 or the memory 1002 so that the processor 1001 performs computation to control communication that is performed by the communication device 1004 or to control at least one of reading and writing of data in the memory 1002 and the storage 1003.

For example, the processor 1001 operates an operating system to control the entire computer. The processor 1001 may be configured as a central processing unit (CPU) including an interface with peripheral devices, a control device, a computing device, a register, and the like.

Further, the processor 1001 reads a program (program code), a software module, data, or the like from at one of the storage 1003 and the communication device 1004 into the memory 1002 and performs various processes according to the program, the software module, the data, or the like. As the program, a program for causing the computer to perform at least some of the operations described in the above-described embodiment may be used. For example, the estimation unit 12 may be realized by a control program that is stored in the memory 1002 and operated on the processor 1001, and other functional blocks may be similarly realized. Although the case in which the various processes described above are performed by one processor 1001 has been described, the processes may be performed simultaneously or sequentially by two or more processors 1001. The processor 1001 may be implemented using one or more chips. The program may be transferred from a network via an electrical communication line.

The memory 1002 is a computer-readable recording medium and may be configured of, for example, at least one of a read only memory (ROM), an erasable programmable ROM (EPROM), an electrically erasable programmable ROM (EEPROM), and a random-access memory (RAM). The memory 1002 may be referred to as a register, a cache, a main memory (a main storage device), or the like. The memory 1002 may store an executable program (program code), software modules, and the like to implement the communication control method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (e.g., a compact disc, a digital versatile disc, or a Blu-ray (registered trademark) disc), a smart card, a flash memory (e.g., a card, a stick, or a key drive), a floppy (registered trademark) disk, a magnetic strip, and the like. The storage 1003 may be referred to as an auxiliary storage device. The storage medium described above may be, for example, a database containing at least one of the memory 1002 and the storage 1003, a server, or another appropriate medium.

The communication device 1004 is hardware (a transmitting and receiving device) for performing communication between computers via at least one of a wired network and a wireless network, and is also referred to as, for example, a network device, a network controller, a network card, or a communication module.

The input device 1005 is an input device (e.g., a keyboard, a mouse, a microphone, a switch, a button, or a sensor) that receives an input from the outside. The output device 1006 is an output device (e.g., a display, a speaker, or an LED lamp) that performs an output to the outside. The input device 1005 and the output device 1006 may have an integrated configuration (e.g., a touch panel).

Further, the respective devices such as the processor 1001 and the memory 1002 are connected by the bus 1007 for information communication. The bus 1007 may be configured using a single bus or may be configured using different buses between the devices.

Further, the population estimation device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these hardware devices.

Although the present embodiment has been described in detail above, it will be apparent to those skilled in the art that the present embodiment is not limited to the embodiments described in the present disclosure. The present embodiment may be implemented as a modification and change aspect without departing from the spirit and scope of the present invention as determined by the description of the claims. Accordingly, the description of the present disclosure is for illustrative purposes and should not be construed as a limiting sense with respect to the present embodiment.

A process procedure, a sequence, a flowchart, and the like in each aspect or embodiment described in the present disclosure may be in a different order unless inconsistent. For example, for the method described in the present disclosure, elements of various steps are presented in an exemplary order, and the elements are not limited to the specific order presented.

Input or output information or the like may be stored in a specific place (e.g., a memory) or may be maintained in a management table. Input or output information or the like can be overwritten, updated, or additionally written. Output information or the like can be deleted. Input information or the like may be transferred to another device.

A determination may be performed using a value (0 or 1) represented by a bit, may be performed using a Boolean value (true or false), or may be performed by a numerical value comparison (e.g., comparison with a predetermined value).

Each aspect/embodiment described in the present disclosure may be used alone, may be used in combination, or may be used by being toggled according to the execution. Further, a notification of predetermined information (e.g., a notification of "being X") is not limited to being made explicitly, and may be made implicitly (e.g., a notification of the predetermined information is not made).

Software should be broadly construed such that the software means an instruction, an instruction set, a code, a code segment, a program code, a program, a subprogram, a software module, an application, a software application, a software package, a routine, a subroutine, an object, an executable file, a execution thread, a procedure, a function, and the like, regardless of whether the software is called software, firmware, middleware, microcode, hardware description language, or any other name.

In addition, software, instructions, information, and the like may be transmitted and received via a transmission medium. For example, when software is transmitted from a website, a server, or other remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of several different technologies. For example, data, an instruction, a command, information, a signal, a bit, a symbol, a chip, and the like that may be referred to throughout the above description may be represented by a voltage, a current, an electromagnetic wave, a magnetic field or a magnetic particle, an optical field or a photon, or any combination thereof.

Further, the information, parameters, and the like described in the present disclosure may be expressed using an absolute value, may be expressed using a relative value from a predetermined value, or may be expressed using other corresponding information.

Names used for the parameters described above are not in any way restricted names. Further, equations or the like using these parameters may be different from those explicitly disclosed in the present disclosure. Since different information elements may be identified by any suitable names, the different names assigned to these different information elements are not in any way restricted names.

The description "based on" as used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way to distinguish between two or more elements. Thus, the references to the first and second elements do not imply that there can be only two elements, or that the first element must in any way precede the second element.

When the terms "include", "including" and their conversions are used in the present disclosure, these terms are intended to be as comprehensive as the term "comprising". Further, the term "or" as used in the present disclosure is not intended to be an exclusive OR.

For example, in the present disclosure, when articles such as "a", "an", and "the" in English are added by translation, the present disclosure may include that nouns following these articles are plural.

In the present disclosure, the sentence "A and B are different" may mean "A and B are different from each other". The sentence may mean "each of A and B is different from C". Terms such as "separate", "coupled", and the like may also be interpreted similarly to "different".

REFERENCE SIGNS LIST 10 population estimation server (population estimation device)
11 signal acquisition unit
12 estimation unit 20 mobile terminal
50 latest information DB (database)

The invention claimed is:

1. A population estimation device, comprising:
processing circuitry configured to
acquire a signal periodically transmitted from a mobile terminal carried by a user;
aggregate the acquired signals for each area and for each estimation-unit-period, and estimate a population for each area and for each estimation-unit-period based on an aggregation result; and
after acquiring the signal from a first mobile terminal staying in a first area, when an absent period in which the signal is not acquired from the first mobile terminal and which is longer than a transmission interval of the signal in a normal state occurs, interpolate a pseudo signal associated with the first mobile terminal in the absent period, and aggregate signals while excluding the signal first transmitted from the first mobile terminal after the absent period from an aggregation target,
wherein when a stay area of the first mobile terminal specified by the signal first transmitted from the first mobile terminal after the absent period is a second area different from the first area, the processing circuitry is configured to:
divide the absent period into a first period and a second period after the first period;
interpolate the pseudo signal associated with the first area for the first period; and
interpolate the pseudo signal associated with the second area for the second period.

2. The population estimation device according to claim 1, wherein the signal is a location registration signal.

3. The population estimation device according to claim 1, wherein the processing circuitry is configured to further interpolate the pseudo signal for one time after the absent period.

4. The population estimation device according to claim 1, wherein the processing circuitry is configured to interpolate the pseudo signal when a condition that the absent period is equal to or less than a predetermined threshold period is satisfied, and not to interpolate the pseudo signal when the absent period does not satisfy the condition.

5. The population estimation device according to claim 1, wherein the processing circuitry is configured to interpolate the pseudo signal associated with the first area when a stay area of the first mobile terminal specified by the signal first transmitted from the first mobile terminal after the absent period is identical to the first area or an area within a predetermined threshold distance from the first area.

6. The population estimation device according to claim 1, wherein
the processing circuitry is configured to store the latest information for each mobile terminal in a database indicating a time at which a latest signal is transmitted and a stay position of the mobile terminal specified from the latest signal, and
the processing circuitry is configured to refer to the database to determine whether the absent period occurs for each mobile terminal.

7. A method, implemented by processing circuitry of a population estimation device, comprising:
acquiring a signal periodically transmitted from a mobile terminal carried by a user;
aggregating the acquired signals for each area and for each estimation-unit-period, and estimating a population for each area and for each estimation-unit-period based on an aggregation result; and after acquiring the signal from a first mobile terminal staying in a first area, when an absent period in which the signal is not acquired from the first mobile terminal and which is longer than a transmission interval of the signal in a normal state occurs, interpolating a pseudo signal associated with the first mobile terminal in the absent period, and aggregating signals while excluding the signal first transmitted from the first mobile terminal after the absent period from an aggregation target, wherein when a stay area of the first mobile terminal specified by the signal first transmitted from the first mobile terminal after the absent period is a second area different from the first area, the method includes dividing the absent period into a first period and a second period after the first period;

interpolating the pseudo signal associated with the first area for the first period; and interpolating the pseudo signal associated with the second area for the second period.

\* \* \* \* \*